Patented May 13, 1924.

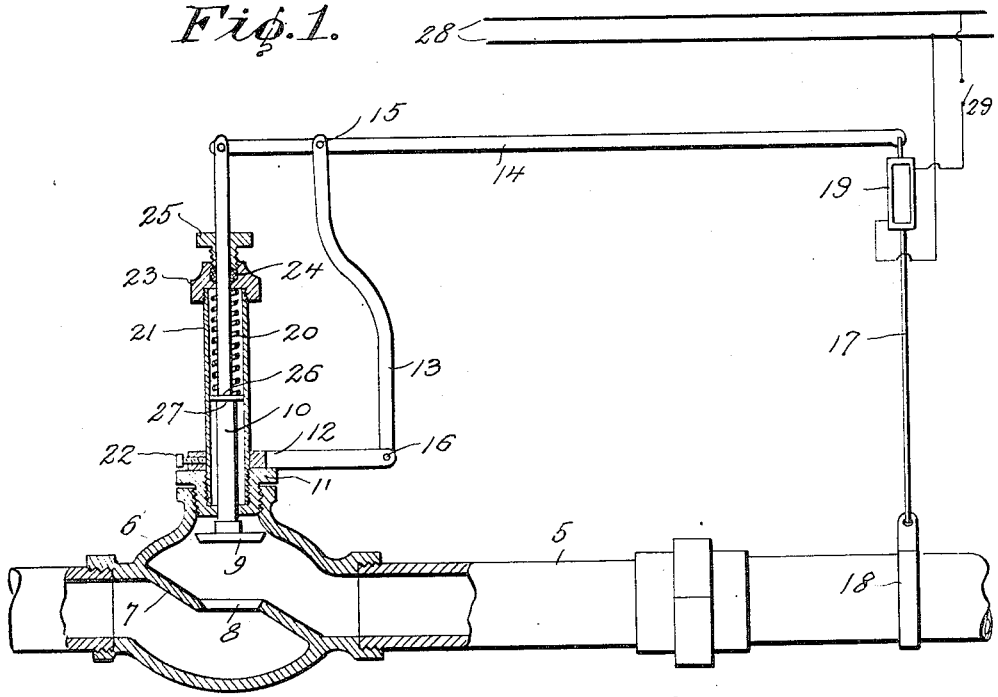
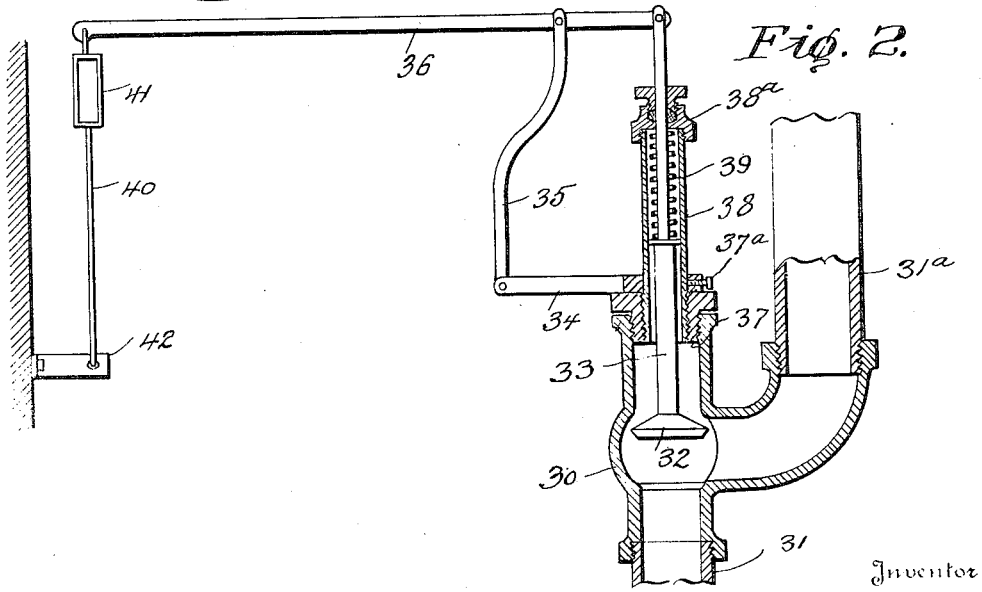

1,494,304

UNITED STATES PATENT OFFICE.

EMIL A. GRABOWSKI, OF ESCANABA, MICHIGAN.

SAFETY VALVE.

Application filed April 4, 1922. Serial No. 549,519.

*To all whom it may concern:*

Be it known that I, EMIL A. GRABOWSKI, a citizen of the United States, residing at Escanaba, in the county of Delta and State of Michigan, have invented certain new and useful Improvements in Safety Valves, of which the following is a specification.

This invention relates to thermally controlled valves which are used in connection with pipe lines carrying gasoline and other highly inflammable and explosive liquids, and which are self-closing in case a fire occurs in the vicinity of the valve.

The invention has for its object to provide a very simple, reliable and efficient valve of the kind stated, and also one which can be closed at will from a distant point in the event of a fire in any part of the building not in the immediate vicinity of the valve.

With the object stated in view, the invention consists in a novel combination and arrangement of parts to be hereinafter described and claimed, and in order that the same may be better understood, reference is had to the accompanying drawing, wherein:

Figure 1 is an elevation, partly in section, showing one embodiment of the invention, and Fig. 2 is a similar view showing another embodiment of the invention.

Referring specifically to the drawing, and more particularly to Fig. 1, the reference numeral 5 denotes a pipe line in which is interposed the automatic shut-off valve which is the subject matter of the present application for patent. The valve mechanism is designed more particularly for connection to a line of pipe conducting a highly inflammable and explosive liquid, such as gasoline, but it can also be applied to a line of pipe conducting illuminating gas or the like.

The casing of the valve is shown at 6, the same having its ends suitably constructed for connection to the pipe line 5. The valve casing contains a partition 7 provided with a port 8 controlled by a valve 9 having the shape of a disk with a beveled edge to make a tight closure when seating on the port 8, the edge of the latter being correspondingly beveled. The valve is mounted for a reciprocatory motion, it being carried by a slidable stem 10. By mechanism to be presently described, the valve is held normally off its seat, so that there is a free and uninterrupted flow of the gasoline or other fluid through the valve casing to the place where such fluid is to be delivered by the pipe line 5.

The top of the valve casing 6 is closed by a screw plug 11 having a central aperture through which the valve stem 10 slidably passes. On top of the plug 11 seats a horizontally positioned bracket arm 12 carrying at its outer end an upstanding link 13 which serves as a fulcrum for a lever 14, the latter being pivoted to the top of the link, as shown at 15, whereas the link is pivoted at the bottom, as shown at 16, to the arm 12. One end of the lever 14 is pivotally connected to the upper end of the valve stem 10, and the other end of the lever is held down by being anchored to the pipe line 5 by means of a rod, cable, or the like, shown at 17, the latter being connected to the pipe line by means of a clamp 18. The connection 17 is in two sections which are connected by a fusible link or similar element 19. The connection 17, when the link 19 is intact, holds the valve 9 open.

The valve 9 is automatically closed by a spring 20 when the link 19 is fused and ruptured by the heat from a fire in the vicinity of the apparatus. This spring is enclosed in an upright cylindrical housing 21 supported by the valve casing plug 11, the bottom of the housing being threaded to screw into the top of the plug. The housing 21 passes through the inner end of the arm 12, the same being apertured for this purpose. A set screw 22, threaded through the arm 12 to engage the side of the housing 21, locks the arm and prevents the same from swinging but permits rotation thereof for disposing the anchoring means in different positions.

The valve stem 10 passes through the housing 21, and through a stuffing box 23 fitted to the upper end thereof, said stuffing box containing a packing 24 which is compressed around the valve stem by a gland nut 25 through which latter the valve stem passes for connection of its upper extremity to the lever 14. The stuffing box can be packed from the outside, and it effectually prevents the escape of gas fumes.

The spring 20 is coiled around the valve stem 10, its upper end bearing against the stuffing box 23, and its lower end seating on a washer or similar abutment 26 held on the valve stem by a shoulder 27 thereon. The downward pressure of the spring 20 transmitted to the stem 10 causes said stem to go down and carry the valve 9 to closing position, when the link 19 fuses and releases the lever 14.

The connection 17 which holds the lever 14 down against the tension of the spring 20 is shown anchored to the pipe line 5, but it can be anchored to any other fixed support upon backing the set screw 22 and swinging the supporting arm 12 to position the lever in any desired location.

The valve can also be operated at will from a distant point by interposing the fusible element 19 in an electric circuit which may be a branch from the lighting circuit 28 of the building, said branch circuit being provided with a suitable switch 29. When this switch is closed, the electric current passing through the element 19 fuses the same, and whereupon the lever 14 is released and the spring 20 is permitted to close the valve 9. The fuse-controlling circuit can be carried to various parts of the building, so that the valve may be closed from any part of building even though the fire may be remote from the room where the valve is located.

Fig. 2 shows the valve mechanism placed in a vertical position for connection to a correspondingly positioned pipe line. The valve casing is shown at 30, the same having a connection at the bottom with the pipe line 31, and a connection at the side with a continuation 31$^a$ of said line. The valve 32 is carried by a stem 33 as before. The arm 34 supporting the fulcrum link 35 of the lever 36 is supported in the same manner as the arm 12 hereinbefore described, the valve casing plug being shown at 37, and the set screw for locking the arm at 37$^a$. The plug 37 has a vertical opening into which the lower end of the spring housing 38 is screwed, the upper end of the housing being closed by a stuffing box 38$^a$ which forms an abutment for the upper end of the valve-closing spring 39. The valve operates in the same way as the one described hereinbefore. The sectional rod or similar element 40 in which the fusible element 41 is interposed may be anchored to a wall bracket or other suitable fixed support 42.

The last-described structure is well adapted for an underground system of piping, and the valve can be placed partly underground.

I claim:

A thermally controlled valve comprising a casing, a valve in said casing, a slidable stem carrying the valve, a spring connected to the stem for moving the same in a direction to close the valve, a housing for the spring, said housing being carried by the valve casing, an arm mounted at its inner end on the housing and rotatable thereon, a set screw for locking the arm on the housing, a fulcrum link pivotally supported by the arm, a lever pivoted between its ends to said link and having one of the ends connected to the valve, and fusible means connected to the other end of the lever for holding said lever to maintain the valve in open position against the tension of the aforesaid spring.

In testimony wherof I affix my signature.

EMIL A. GRABOWSKI.